(12) United States Patent
Prasad

(10) Patent No.: US 8,375,629 B2
(45) Date of Patent: Feb. 19, 2013

(54) PRODUCTION OF NOVEL PRECISION CUSTOMIZED CONTROL RELEASE FERTILIZERS

(75) Inventor: Durga Yandapalli Prasad, Andhra Pradesh (IN)

(73) Assignee: Bijam Biosciences Private Limited, Hyderabad (IN)

( * ) Notice: Subject to any disclaimer, the term of this patent is extended or adjusted under 35 U.S.C. 154(b) by 471 days.

(21) Appl. No.: 12/312,328

(22) PCT Filed: Nov. 6, 2007

(86) PCT No.: PCT/IB2007/003379
§ 371 (c)(1),
(2), (4) Date: Oct. 6, 2009

(87) PCT Pub. No.: WO2008/056234
PCT Pub. Date: May 15, 2008

(65) Prior Publication Data
US 2010/0024501 A1 Feb. 4, 2010

(30) Foreign Application Priority Data
Nov. 6, 2006 (IN) .......................... 2038/CHE/2006

(51) Int. Cl.
C05F 11/00 (2006.01)
C05F 11/08 (2006.01)
C05D 9/00 (2006.01)
A01C 1/06 (2006.01)

(52) U.S. Cl. ............... 47/57.6; 71/23; 71/62; 71/64.03; 71/64.1; 504/100

(58) Field of Classification Search ............... 71/11–30, 71/64.1, 64.03; 504/100; 47/57.6
See application file for complete search history.

(56) References Cited

U.S. PATENT DOCUMENTS

| 6,958,232 B2 | 10/2005 | Prasad |
| 2004/0077498 A1* | 4/2004 | Lynch .......................... 504/100 |

FOREIGN PATENT DOCUMENTS

| CN | 1834072 A | 9/2006 |
| IN | 2020/CHE/2006 A | 9/2009 |
| WO | WO 2004/101435 A1 | 11/2004 |

OTHER PUBLICATIONS

International Search Report dated Aug. 18, 2008 for International Patent Application No. PCT/IB2007/003379.
U.S. Appl. No. 60/865,985, filed Nov. 15, 2006, Prasad, Yandapalli Durga.

* cited by examiner

*Primary Examiner* — Wayne Langel
(74) *Attorney, Agent, or Firm* — Foley & Lardner LLP

(57) ABSTRACT

The present invention relates to novel precision customized control release fertilizers such as seed encapsulation nutrients, liquid formulation treatment for roots of seedlings before transplantation or for soil application or for foliar application and fertilizer granules or tablets for effective enhancement of crop yield. The fertilizer comprises a crop specific enstornized fertilizer and/or a normal fertilizer, an agropolymer made by—reacting an alkaline or hydrogen peroxide with plant material and a transition metal silicate or an amorphous silica.

36 Claims, 3 Drawing Sheets

FLOW DIAGRAM OF MANUFACTURING MATERIALS FOR NUTRIENT ENCAPSULATION

FLOW DIAGRAM OF MANUFACTURING MATERIALS FOR NUTRIENT ENCAPSULATION

Figure 1:
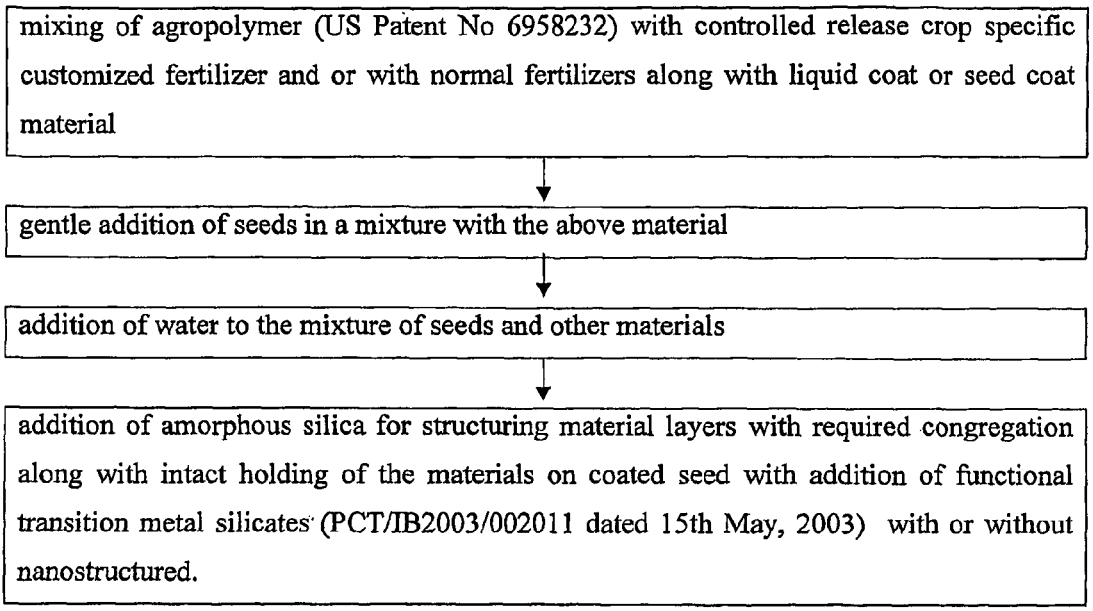
Figure 2:
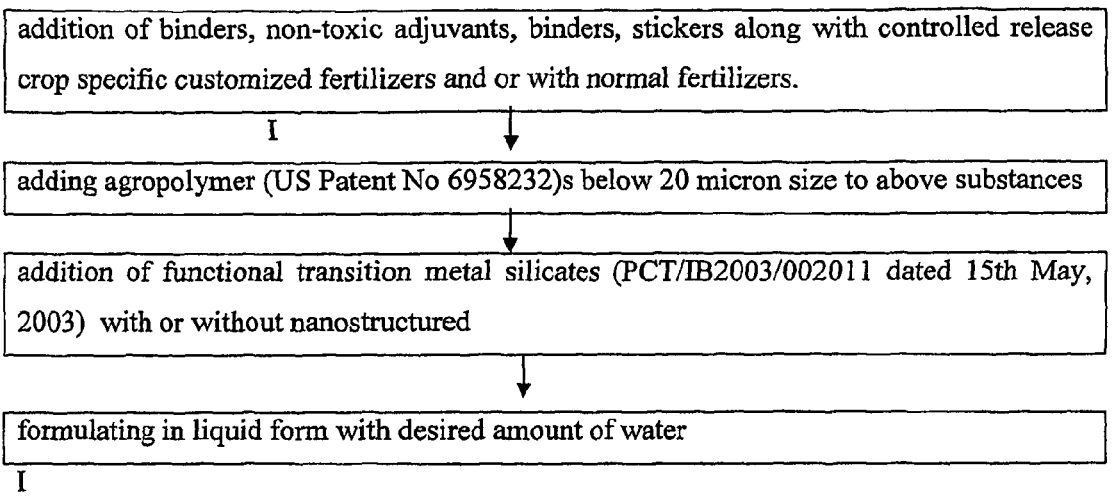

FLOW DIAGRAM OF MANUFACTURING LIQUID FORMULATION FOR TREATMENT OF ROOTS OF SEEDLINGS BEFORE TRANSPLANTATION OR FOR SOIL APPLICATION OR FOR FOLIAR APPLICATION

FIGURE -3

FLOW DIAGRAM OF MANUFACTURING OF FERTILIZER GRANULES OR TABLETS

| addition of binders, non-toxic adjuvants, binders, stickers along with controlled release crop specific customized fertilizers and or with normal fertilizers. |
|---|

↓

| adding agropolymer (US Patent No 6958232)s below 20 micron size to above substances |
|---|

↓

| addition of functional transition metal silicates (PCT/IB2003/002011 dated 15th May, 2003) to above substances with or without nanostructured |
|---|

↓

| Granulation or tableting with required size and shape |
|---|

PRODUCTION OF NOVEL PRECISION CUSTOMIZED CONTROL RELEASE FERTILIZERS

FIELD OF THE INVENTION

This invention in general relates to the field of agricultural sciences. In particular, this invention pertains to production of novel precision fertilizers. This invention also relates to a method of manufacturing precision, customized, control release fertilizers having applications in the field of agriculture.

BACK GROUND OF THE INVENTION

The incorporation of nutrients in seed coatings provides a unique opportunity to supply each sown seed with an accurately controlled quantity of nutrient that may preferentially available to the sown species and less available to any neighboring weed species. Controlled release fertilizers are coated or encapsulated fertlizers and slow release fertilizers have a chemically reduced or low solubility, the latter being mainly derivatives of urea. An ideal synchronized fertilizer would release its nutrients according to the plant growth curve.

To correct the deficiencies in the plant nutrient application methods, requires development of precision fertilizer customized technology and therefore the objective of the present invention is to invent method of providing an accurately controlled quantity of nutrient and to develop precision fertilization customized technology with better specifications for individual crops and environments with a holistic approach to agricultural management for better economics.

OBJECTS OF THE INVENTION

Accordingly, the primary object of this invention is to invent novel precision customized control release fertilizers production.

Another objective of this invention is to develop a method of producing crop specific novel precision customized control release fertilizers to coat seeds or to treat the roots of seedlings at the time of sowing or for soil application or for foliar application.

Still another object of the invention is to provide necessary method for production of materials needed for accurate application of fertilizers.

SUMMARY OF THE INVENTION

To meet the above objects and others, the present invention provides novel precision control release fertilizers with accurate placement with controlled release nature with specificity, selectivity along with crop specific customized control release nutrition to achieve more viable agriculture, and a method of producing such fertilizers.

DETAILED DESCRIPTION OF THE INVENTION

Now this invention will be described in detail so as to illustrate and explain various salient features of the invention.

One embodiment of the invention is to provide novel precision fertilizers production. Another embodiment of the present invention relates to a method of production of desired novel precision control release fertilizers preferably in liquid form to treat seeds or seedlings before plantation or for soil application or for foliar application.

The invention also involves production of materials suitable for encapsulation of crop specific customized control release fertilizers on seeds/seeds coats.

The present invention preferably relates to a novel precision customized control release fertilizers such as seed encapsulation nutrients, liquid formulation treatment for roots of seedlings before transplantation or for soil or for foliar application and fertilizer granules or tablets for effective enhancement of yield of crops with precision fertilizer crop specific customized plant nutrition management, said fertilizer comprising a crop specific customized fertilizer and/or a normal fertilizer along with the liquid coating or seed coating material as defined in U.S. Pat. No. 6,958,232 and amorphous silica for structuring material layers with required congregation along with intact holding of the materials on coated seed along with addition of functional transition metal silicates (PCT/IB2003/002011 dated 15 May, 2003) with or without nanostructured.

In a preferred embodiment, the present invention provides a method of producing material for encapsulation of crop specific customized control release fertilizers on seed coats and said method comprising of following steps:
1. mixing of agropolymer (U.S. Pat. No. 6,958,232) with crop specific customized control release fertilizer and/or with normal fertilizers along with liquid coat or seed coat material;
2. gentle addition of seeds in a mixture with the above material;
3. addition of water to the mixture of seeds and other materials; and
4. addition of amorphous silica for structuring material layers with required congregation along with intact holding of the materials on coated seed along with addition of functional transition metal silicates (PCT/IB2003/002011 dated 15 May, 2003) to above substances with or without nanostructured.

The crops specific customized control release fertilizer has been selected from the ones described in the applicant's co-pending U.S. Provisional Application No. 60/865,985, (contents of which is incorporated herein as reference), and Indian Patent Application No. 2020/CHE/2006 (contents of which is incorporated herein as reference). The present invention explains production of novel lignite based plant nutritional products with substantial enhancement of nutritionally active constituents with economical methods by structural modulation along with combining of essential nutrients in order to design products with specificity and selectivity to achieve superior quantity and quality crop products along with substantial soil health comprising macro and micro elements required for plant nutrition. Lignite is a derivative of fossilized vegetation which was lied down in the carboniferous period millions of years ago. Because of its vegetative origin this material is very rich and beneficial to plants today. Humic and fulvic acids which are considered to be very important for plant health can be derivatized from lignite and the present research work is aimed to produce useful plant nutrition product from lignite. Thus, in one embodiment a method is provided for producing lignite based slant nutritional products by (a) powdering lignite material, (b) micronizing the lignite powder to required micron size, (c) drying the micronized lignite powder for removal of excess moisture, (d) treating the micronized lignite powder with hydrogen peroxide with or with nitric acid for effective structural conversion, (e) treating said material with ammonia and/or with potassium and/or with phosphoric acid and/or with other aqueous solutions containing macro and/or micro nutrients, (f) neutralizing the reaction solution by appropriate addition of acidic and/or alkaline nutrient solutions, (g) Structuring the resultant material into a format of a tablet, pellet, granule, grill or powder or other possible shapes effective for use, (h) drying the resultant product at room temperature or with a dryer. The combination and amount of soluble nutrient salts mixed with micronized lignite powder can be varied based on plant specificity and with selective requirements based on time of application and type of application such as soil, foliar or fertigation. The result is lignite based plant nutritional products for effective and economic integrated fertilizer management.

The normal or conventional fertilizers may be selected from superphosphates or diammonium phosphates and other conventionally known phosphatic fertilizers.

The amount of amourphous silica can be in the range of 10 to 50% wt./vol., of the mixture, preferably the amount may be in the range of 10 to 25% wt./vol. The quantum of agropolymer or amourphous silica is depending upon the size of the seeds. If the size of the seeds is bigger, then the quantum of the agropolymer and amourphous silica can be lesser when compared with requirement of agropolymer and amourphous silica in case of smaller sized seeds.

In a preferred embodiment, the agropolymer comprising a carbohydrate and silica matrix obtained from an agricultural crop selected from the group consisting of *Oryza sativa*, *Panicum miliaceum*, *Setaria italica*, *Cajanus cajan*, *Vigna mungo*, *Vigna radiata*, *Triticum* sp., *Ricinus communis*, *Helianthus annus*, *Gossypium* sp., and *Arachis* sp, said carbohydrate and silica matrix being substantially devoid of proteins, tannins and polyphenols, said matrix further comprising metal binding reactive sites.

In a preferred embodiment, the functional transition metal silicate single or mixture with multiple combinations characterized in that the said transition metal silicate is selected from the group comprising:
  a. Cupric silicates having silica to copper ratio in the range of 1:0.34 to 1:5.15;
  b. Zinc silicates having silica to zinc ratio in the range of 1:2 to 1:12;
  c. Silver silicates having silica to silver ratio in the range of: 1:15 to 1:19.5;
  d. Manganese silicates having silica to manganese ratio in the range of 1:1 to 1:1.9; and
  e. Zirconium silicates having silica to zirconium ratio in the range of 1:0.77 to 1:2.9, the said transition metal silicates (PCT/IB2003/002011 dated 15 May, 2003) are prepared by the process comprising the steps of:
    (i) adding a transitional metal salt solution to a soluble alkali silicate solution to form a mixture;
    (ii) forming a precipitate of a transitional metal silicate, and
    (iii) washing and drying the precipitate thus formed to obtain the transitional metal silicate,
  in said step (i), the ratio between the transitional metal salt solution to the alkali silicate solution is varied, the temperature at which the solutions are mixed is varied between 20° to 90° C., and the pH value of the medium is varied between about 2 to about 11.

In a preferred embodiment, the present invention provides method of producing crop specific customized control release fertilizers suitable for treating roots of the seedlings before plantation or for soil application or for foliar application, said method comprising the following steps:
  (i) addition of binders, non-toxic adjuvant, stickers along with controlled release crop specific customized fertilizers and or with normal fertilizers;
  (ii) adding agro polymers below 20 micron size to above substances;
  (iii) addition of functional transition metal silicates (PCT/IB2003/002011 dated 15 May, 2003) to above substances with or without nanostructured; and
  (iv) formulating in liquid form with desired amount of water.

The binder, adjuvant, fillers, stickers may be selected from carboxy methyl cellulose, polyvinyl alcohol, starches and cellulose. The binder, adjuvant, fillers and stickers can be selected from those that are commercially available. The quantum of said binder, adjuvant, fillers, stickers may be in the range of 5 to 15% wt., preferably 10 to 30% wt., and most preferably in the range of 10 to 25% wt., The functional transitional metal silicate may be in the range of 0.1 to 25% wt., preferably 1 to 10% wt. The functional transitional metal silicate can preferably be a mixture of cupric silicate, zinc silicate and iron silicate.

In another embodiment, present invention describes manufacturing of crop specific customized control release fertilizer granules or tablets with controlled release nature of nutrients based on time optimized for plant uptake, the said method comprising the following steps:
  (i) addition of binders, non-toxic adjuvant, stickers along with crop specific controlled release customized fertilizers or with normal fertilizers:
  (ii) adding agropolymers (U.S. Pat. No. 6,958,232) below 20 micron size to above substances;
  (iii) addition of functional transition/metal silicates (PCT/IB2003/002011 dated 15 May, 2003) above substances with or without nanostructured; and
  (iv) granulating or tableting with required size and shape.

In yet another embodiment, addition of functional transition metal silicates (PCT/IB2003/002011 dated 15 May, 2003) with or without nanostructured, with the novel precision customized control release fertilizers imparts plant protection activity also by controlling microbes such as fungus, bacteria and viruses along with urease inhibition suitable for slow release of urea.

In one more embodiment, the microbes are selected from the group comprising of bacteria, fungus, virus and combinations thereof.

In yet another embodiment, novel precision customized control release fertilizers the microbes are selected from the group comprising of bacteria, fungus, virus and combinations thereof and the bacteria is coliform bacteria, Gram positive bacteria, Gram negative bacteria or combinations thereof.

In one more embodiment, wherein the novel precision customized control release fertilizers also control plant pathogen and used as pesticides and/or fertilizers.

BRIEF DESCRIPTION OF THE
ACCOMPANYING DRAWINGS

Now, the invention will be described in the following description. The nature of the invention and the manner in which the invention is to be carried out is described in detail here below.

In the accompanying drawings: FIG. (1) relates to various steps involved in the manufacturing process of materials for crop specific customized nutrient encapsulation on seeds.

In the accompanying drawings: FIG. (2) relates to various steps involved in the manufacturing of liquid formulation for treating roots of seedlings before transplantation.

In the accompanying drawings: FIG. (3) relates to various steps involved in the manufacturing of crop specific customized fertilizer granules or tablets.

Now, the applicant provides following specific description by way of examples and illustrations of the invention and this should not be construed to limit the scope of invention in any manner.

Agropolymer (U.S. Pat. No. 6,958,232) was added to controlled release crop specific customized fertilizer and/or with normal fertilizers along with plant seeds at a ratio of 1:50:10 to 1:300:50 (w/w/w); gentle addition of seeds was done in a mixture such as planetary mixture below 200 rpm. Water was added to optimize the mixing, and adhesion of the materials on seed. Amorphous silica was added to structure material layers with required congregation along with intact holding of the materials on coated seeds along with addition of functional transition metal silicates (PCT/IB2003/002011 dated 15 May, 2003) to above substances with or without nanostructured. The nano-structured FTMS are described in the Applicant's co-pending Indian Patent Application No. 2113/CHE/2006, contents of which is incorporated herein as reference.

The coating of the seeds can be performed by two methods. The first method comprising coating the seeds with amorphous silica and thereafter coating with functional transitional metal silicates (FTMS), which coated seeds is further coated with customized crops specific customized control release fertilizer. The second method comprising mixing aluminum silicate, FTMS and customized control release fertilizer to prepare a mixture and finally adding the seeds in the mixture and gently stirring the entire mixture to obtain uniform coating on the seeds and finally drying the coated seeds.

The thickness of coating may be in the range of 0.1 mm to 0.5 cm. However, the coating should not be of such thickness so as to prevent the germination of the seeds. A skilled person in the art should not have any problem in arriving at the required thickness.

In the mixture of amorphous silica, FTMS and customized control release fertilizer, the amount of amorphous silica is in the range of 5 to 50% wt, the amount of FTMS is in the range of 0.1 to 20% wt and the amount of customized control release fertilizer is in the range of 5 to 50% wt.

Now the applicant provides following specific description for manufacturing of liquid formulation for treating roots of seedlings before transplantation or for soil application or for foliar application. Binders, non-toxic adjuvants, stickers along with controlled release fertilizers and or with normal fertilizers were added to agropolymers (U.S. Pat. No. 6,958,232). Agropolymers (U.S. Pat. No. 6,958,232) were micronized below 20 micron size before addition to above substances. Later, functional transition metal silicates (PCT/IB2003/002011 dated 15 May, 2003) with or without were added such as cupric silicate, zinc silicate etc. to the above substances. The ratio of fertilizer [controlled release crop specific customized fertilizer and or with normal fertilizers] to agropolymers (U.S. Pat. No. 6,958,232) to transition metal silicates (PCT/IB2003/002011 dated 15 May, 2003) to other substances [binders etc.,] varied from 100:5:1:05 to 100:20:10.

Now the applicant provides following specific description for manufacturing of fertilizer granules or tablets for treating roots of seedlings. Binders, non-toxic adjuvants, stickers along with controlled release fertilizers and or with normal fertilizers were added to agropolymers (U.S. Pat. No. 6,958,232) Agropolymers (U.S. Pat. No. 6,958,232) were micronized below 20 micron size before addition to above substances. Later, functional transition metal silicates (PCT/IB2003/002011 dated 15 May, 2003) with or without nanostructured were added such as cupric silicate, zinc silicate etc. to the above substances. The ratio of fertilizers [controlled release crop specific customized fertilizer and or with normal fertilizers] to agropolymer (U.S. Pat. No. 6,958,232) to transition metal silicates (PCT/IB2003/002011 dated 15 May, 2003) to other substances [binders etc] varied 100:5:1: 0.05 to 100:20:20:10. Fertilizer granules or tablets with required size and shape were manufactured.

Present invention explains production of novel precision fertilizers suitable for more viable agriculture. The various field trials, pot culture studies and field experimentation studies conducted on crops such as rice, cotton, chilies, ground nut and maize show significant enhancement in the yield when compared with the conventional fertilizers. The enhancement in the yield is to the extent of 10 to 25% when compared with the conventional fertilizers.

The above description has been given by way of examples only and it should not be restricted to above explanation but also equally having valid scope and ambit with various combinations.

I claim:

1. A liquid formulation for use in treatment of roots of seedlings or for soil application or for foliar application, said liquid formulation comprising water having dissolved therein:
   (i) a crop specific customized fertilizer and/or a normal fertilizer;
   (ii) an agropolymer comprising a carbohydrate and silica matrix, obtained from plant parts of an agricultural crop selected from the group consisting of *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp, wherein said matrix is substantially devoid of proteins, tannins, and polyphenols, wherein said matrix further comprises metal-binding reactive sites; and
   (iii) one or more functional transition metal silicates with or without nanostructure, said functional transition metal silicates being selected from the group consisting of:
      a. Cupric silicates having silica to copper ratio in the range of 1:0.34 to 1:5.15;
      b. Zinc silicates having silica to zinc ratio in the range of 1:2 to 1:12;
      c. Silver silicates having silica to silver ratio in the range of 1:15 to 1:19.5;
      d. Manganese silicates having silica to manganese ratio in the range of 1:1 to 1:1.9; and
      e. Zirconium silicates having silica to zirconium ratio in the range of 1:0.77 to 1:2.9.

2. The liquid formulation as claimed in claim 1, wherein the formulation further comprises one or more members selected from the group consisting of binders, non-toxic adjuvant, fillers and stickers.

3. The liquid formulation as claimed in claim 2, wherein the binders, non-toxic adjuvant, fillers and stickers are selected from the group consisting of carboxy methyl cellulose, polyvinyl alcohol, starches and cellulose.

4. The liquid formulation as claimed in claim 2, wherein a quantum of the binders, non-toxic adjuvant, fillers and stickers are in the range of 10 to 30% by weight.

5. The liquid formulation as claimed in claim 4, wherein the binders, non-toxic adjuvant, fillers and stickers is in the range of 10 to 25% by weight.

6. The liquid formulation as claimed in claim 1, wherein a ratio between the crop specific customized fertilizer and/or a normal fertilizer, the agropolymer and the functional transition metal silicate is in the range of 100:5:1 to 100:20:10.

7. The liquid formulation as claimed in claim 2, wherein a ratio between the crop specific customized fertilizer and/or a normal fertilizer, the agropolymer, the functional transition metal silicate and one or more members selected from the group consisting of binders, non-toxic adjuvant, fillers and stickers is in the range of 100:5:1:0.05 to 100:20:20:10.

8. A fertilizer granule comprising:
(i) a crop specific customized fertilizer and/or a normal fertilizer;
(ii) an agropolymer comprising a carbohydrate and silica matrix, obtained from plant parts of an agricultural crop selected from the group consisting of *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp. wherein said matrix is substantially devoid of proteins, tannins, and polyphenols, wherein said matrix further comprises metal-binding reactive sites; and
(iii) one or more functional transition metal silicates with or without nanostructure, said functional transition metal silicates being selected from the group consisting of:
  a. Cupric silicates having silica to copper ratio in the range of 1:0.34 to 1:5.15;
  b. Zinc silicates having silica to zinc ratio in the range of 1:2 to 1:12;
  c. Silver silicates having silica to silver ratio in the range of 1:15 to 1:19.5;
  d. Manganese silicates having silica to manganese ratio in the range of 1:1 to 1:1.9; and
  e. Zirconium silicates having silica to zirconium ratio in the range of 1:0.77 to 1:2.9.

9. The fertilizer granule as claimed in claim 8, wherein the granule further comprises one or more members selected from the group consisting of binders, non-toxic adjuvant, fillers and stickers.

10. The fertilizer granule as claimed in claim 9, wherein the binders, non-toxic adjuvant, fillers and stickers are selected from the group consisting of carboxy methyl cellulose, polyvinyl alcohol, starches and cellulose.

11. The fertilizer granule as claimed in claim 10, wherein quantum of the binders, non-toxic adjuvant, fillers and stickers is in the range of 10 to 30% by weight.

12. The fertilizer granule as claimed in claim 11, wherein the binders, non-toxic adjuvant, fillers and stickers is in the range of 10 to 25% by weight.

13. The fertilizer granule as claimed in claim 11, wherein a ratio between the crop specific customized fertilizer and/or a normal fertilizer, the agropolymer and the functional transition metal silicate is in the range of 100:5:1 to 100:20:20.

14. The fertilizer granule as claimed in claim 11, wherein a ratio between the crop specific customized fertilizer and/or a normal fertilizer, the agropolymer, the functional transition metal silicate and one or more members selected from the group consisting of binders, non-toxic adjuvant, fillers and stickers is in the range of 100:5:1:0.05 to 100:20:20:10.

15. An encapsulated seed comprising:
(i) a seed;
(ii) a crop specific customized fertilizer and/or a normal fertilizer;
(iii) an agropolymer comprising a carbohydrate and silica matrix, obtained from plant parts of an agricultural crop selected from the group consisting of *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp, wherein said matrix is substantially devoid of proteins, tannins, and polyphenols, wherein said matrix further comprises metal-binding reactive sites; and
(iv) amorphous silica; and
(v) one or more functional transition metal silicates with or without nanostructure, said functional transition metal silicates being selected from the group consisting of:
  a. Cupric silicates having silica to copper ratio in the range of 1:0.34 to 1:5.15;
  b. Zinc silicates having silica to zinc ratio in the range of 1:2 to 1:12;
  c. Silver silicates having silica to silver ratio in the range of 1:15 to 1:19.5;
  d. Manganese silicates having silica to manganese ratio in the range of 1:1 to 1:1.9; and
  e. Zirconium silicates having silica to zirconium ratio in the range of 1:0.77 to 1:2.9.

16. The encapsulated seed as claimed in claim 15, wherein the encapsulated seed further comprises a liquid coat material or a seed coat material.

17. The encapsulated seed as claimed in claim 15, wherein the amorphous silica is in the range of 10 to 50% weight/volume.

18. The encapsulated seed as claimed in claim 17, wherein the amorphous silica is in the range of 10 to 25% weight/volume.

19. The encapsulated seed as claimed in claim 15, wherein a ratio between the agropolymer, a crop specific customized fertilizer and/or a normal fertilizer and plant seed is in the range 1:50:10 to 1:300:50 weight/weight/weight.

20. A method of preparing a liquid formulation for use in treatment of roots of seedlings or for soil application or for foliar application, said method comprising the step of dissolving in water:
(i) a crop specific customized fertilizer and/or a normal fertilizer;
(ii) an agropolymer below 20 micron size, the said agropolymer comprising a carbohydrate and silica matrix, obtained from plant parts of an agricultural crop selected from the group consisting of *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp, wherein said matrix is substantially devoid of proteins, tannins, and polyphenols,
wherein said matrix further comprises metal-binding reactive sites; and
(iii) one or more functional transition metal silicates with or without nanostructure, said functional transition metal silicates being selected from the group consisting of:
  a. Cupric silicates having silica to copper ratio in the range of 1:0.34 to 1:5.15;
  b. Zinc silicates having silica to zinc ratio in the range of 1:2 to 1:12;
  c. Silver silicates having silica to silver ratio in the range of 1:15 to 1:19.5;
  d. Manganese silicates having silica to manganese ratio in the range of 1:1 to 1:1.9; and
  e. Zirconium silicates having silica to zirconium ratio in the range of 1:0.77 to 1:2.9; and
(iv) optionally one or more members selected from the group consisting binders, non-toxic adjuvants, fillers and stickers.

21. The method according to claim 20, wherein the said one or more functional transition metal silicates with or without nanostructure are prepared by a process comprising the steps of:
(i) adding a transitional metal salt solution to a soluble alkali silicate solution to form a mixture;
(ii) forming a precipitate of a transitional metal silicate, and
(iii) washing and drying the precipitate thus formed to obtain the transitional metal silicate, wherein in said step (i), ratio between the transitional metal salt solution to the alkali silicate solution is varied, temperature at which the solutions are mixed is varied between 20° to 90° C., and pH value of the mixture is varied between about 2 to about 11.

22. The method according to claim 20, wherein a quantum of the functional transition metal silicates is in the range of 0.1% to 25% by weight.

23. The method according to claim 20, wherein a quantum of the functional transition metal silicates is in the range of 1% to 10% by weight.

24. A method of preparing a fertilizer granule, said method comprising:
(I) obtaining a mixture comprising:
(i) one or more of binders, non-toxic adjuvants, fillers and stickers
(ii) a crop specific customized fertilizer and/or a normal fertilizer;
(iii) an agropolymer below 20 micron size, the said agropolymer comprising a carbohydrate and silica matrix, obtained from plant parts of an agricultural crop selected from the group consisting of *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp, wherein said matrix is substantially devoid of proteins, tannins, and polyphenols, wherein said matrix further comprises metal-binding reactive sites; and
(iii) one or more functional transition metal silicates with or without nanostructure, said functional transition metal silicates being selected from the group consisting of:
a. Cupric silicates having silica to copper ratio in the range of 1:0.34 to 1:5.15;
b. Zinc silicates having silica to zinc ratio in the range of 1:2 to 1:12;
c. Silver silicates having silica to silver ratio in the range of 1:15 to 1:19.5;
d. Manganese silicates having silica to manganese ratio in the range of 1:1 to 1:1.9; and
e. Zirconium silicates having silica to zirconium ratio in the range of 1:0.77 to 1:2.9, and
(II) granulating or tableting said mixture to obtain the fertilizer granule.

25. The method according to claim 24, wherein the said one or more functional transition metal silicates with or without nanostructure are prepared by a process comprising the steps of:
(i) adding a transitional metal salt solution to a soluble alkali silicate solution to form a mixture;
(ii) forming a precipitate of a transitional metal silicate, and
(iii) washing and drying the precipitate thus formed to obtain the transitional metal silicate,
wherein in said step (i), ratio between the transitional metal salt solution to the alkali silicate solution is varied, temperature at which the solutions are mixed is varied between 20° to 90° C., and pH value of the mixture is varied between about 2 to about 11.

26. The method according to claim 24, wherein a quantum of the functional transition metal silicates is in the range of 0.1% to 25% by weight.

27. The method according to claim 24, wherein a quantum of the functional transition metal silicates is in the range of 1% to 10% by weight.

28. A method for preparing an encapsulated seed, said process comprising:

i) adding agro polymers below 20 micron size with controlled release crop specific customized fertilizers and/or with normal fertilizers, the said agropolymer comprising a carbohydrate and silica matrix, obtained from plant parts of an agricultural crop selected from the group consisting of *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp, wherein said matrix is substantially devoid of proteins, tannins, and polyphenols, wherein said matrix further comprises metal-binding reactive sites;
ii) gentle addition of seeds in a mixture obtained in step i). and water; and
iii) addition of amorphous silica and one or more functional transition metal silicates with or without nanostructure to obtain the encapsulated seed, said functional transition metal silicates being selected from the group consisting of:
a. Cupric silicates having silica to copper ratio in the range of 1:0.34 to 1:5.15;
b. Zinc silicates having silica to zinc ratio in the range of 1:2 to 1:12;
c. Silver silicates having silica to silver ratio in the range of 1:15 to 1:19.5;
d. Manganese silicates having silica to manganese ratio in the range of 1:1 to 1:1.9; and
e. Zirconium silicates having silica to zirconium ratio in the range of 1:0.77 to 1:2.9.

29. The method according to claim 28, wherein the said one or more functional transition metal silicates with or without nanostructure are prepared by a process comprising the steps of:
(i) adding a transitional metal salt solution to a soluble alkali silicate solution to form a mixture;
(ii) forming a precipitate of a transitional metal silicate, and
(iii) washing and drying the precipitate thus formed to obtain the transitional metal silicate,
wherein in said step (i), ratio between the transitional metal salt solution to the alkali silicate solution is varied, temperature at which the solutions are mixed is varied between 20° to 90° C., and pH value of the mixture is varied between about 2 to about 11.

30. The method according to claim 28, wherein a quantum of the functional transition metal silicates is in the range of 0.1% to 25% by weight.

31. The method according to claim 28, wherein a quantum of the functional transition metal silicates is in the range of 1% to 10% by weight.

32. The method as claimed in claim 28, wherein the amount of amorphous silica is in the range of 10 to 50% wt./vol. of the mixture of step (i).

33. The method as claimed in claim 32, wherein the amount of amorphous silica is in the range of 10 to 25% wt./vol. of the mixture of step (i).

34. The method as claimed in claim 28, wherein an amount of customized control release fertilizer is in the range of 5 to 50% wt.

35. The encapsulated seed as claimed in claim 28, wherein a ratio between the agropolymer, a crop specific customized fertilizer and/or a normal fertilizer and the seed is in the range 1:50:10 to 1:300:50 weight/weight/weight.

36. The method as claimed in claim 28, wherein the thickness of a coating on the encapsulated seed is in the range of 0.1 mm to 0.5 cm.

* * * * *